Patented Dec. 10, 1940

2,224,181

UNITED STATES PATENT OFFICE 2,224,181

PURIFICATION OF PHARMACEUTICALS

Walter G. Christiansen, Glen Ridge, and Edward S. Herlong, Highland Park, N. J., assignors to E. R. Squibb & Sons, New York, N. Y., a corporation of New York No Drawing. Application July 20, 1937, Serial No. 154,558

3 Claims. (Cl. 260—472)

This invention relates to the production of an improved particulate procaine hydrochloride product.

Crystalline or powdered procaine hydrochloride is generally packaged in glass ampules for anesthetic use. Frequently, particles of the procaine hydrochloride (even as commercially prepared for medicinal use) will adhere to each other and to the inside surface of the ampule, thereby increasing the difficulty of preparing a solution of the compound, besides detracting considerably from the appearance of the ampule; this sticking of the particles to each other and to the surface of the ampule is particularly noticeable when the product has been heat-sterilized.

It is the object of this invention to provide a particulate procaine hydrochloride product which is free-flowing and the particles of which will not adhere to each other or to the surface of a glass container, even when the product is heat-sterilized.

In the practice of this invention, commercial procaine hydrochloride is purified by washing with an organic solvent. It has been found that on washing commercial crystalline or powdered procaine hydrochloride with ether, an organic oily or resinous material is extracted. Apparently the presence of this material as a surface impurity is one of the factors contributing to the adherence of particles of procaine hydrochloride to the walls of glass containers. Any organic solvent for oily or resinous materials which does not materially dissolve procaine hydrochloride can be used. Ether is preferred, but petroleum benzine, acetone, and ethylene dichloride can also be used. Preferably, the solvent is anhydrous and leaves no residue on evaporation.

The following example is illustrative of the invention:

3 to 5 pounds of commercial crystalline procaine hydrochloride is packed into a conical percolator plugged with cotton. Then anhydrous ether is slowly percolated through the crystals until a 50 cc. sample of the percolate leaves no oily residue when evaporated to dryness; and finally, the procaine hydrochloride is dried at 56° C. under a vacuum, and the desired portions are sealed into glass ampules. The thus-treated crystals are free-flowing and do not adhere to each other or to the walls of the glass ampules even when the product is heat-sterilized.

The invention may be variously otherwise embodied within the scope of the appended claims.

It is claimed:

1. The method of preparing a particulate procaine hydrochloride which will remain free-flowing after heat-sterilization, which comprises washing commercial particulate procaine hydrochloride with a solvent of the group consisting of ether, petroleum benzine, acetone, and ethylene dichloride, until the wash leaves no oily residue on evaporation.

2. The method of preparing a particulate procaine hydrochloride which will remain free-flowing after heat-sterilization, which comprises washing commercial particulate procaine hydrochloride with a solvent of the group consisting of ether, petroleum benzine, acetone, and ethylene dichloride, until the wash leaves no oily residue on evaporation, and drying the procaine hydrochloride by heating under a vacuum.

3. The method of preparing a particulate procaine hydrochloride which will remain free flowing after heat-sterilization, which comprises washing commercial particulate procaine hydrochloride with anhydrous ether until the wash leaves no oily residue on evaporation.

WALTER G. CHRISTIANSEN.
EDWARD S. HERLONG.